US010634212B2

(12) United States Patent
Iraki et al.

(10) Patent No.: US 10,634,212 B2
(45) Date of Patent: Apr. 28, 2020

(54) BEARING ELEMENT AND BEARING

(71) Applicant: Sumitomo Riko Company Limited, Aichi (JP)

(72) Inventors: Youssef Iraki, Fulda (DE); Martin Gromes, Steinau (DE)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/018,164

(22) Filed: Jun. 26, 2018

(65) Prior Publication Data
US 2019/0003552 A1 Jan. 3, 2019

(30) Foreign Application Priority Data

Jun. 29, 2017 (DE) .................. 10 2017 006 163

(51) Int. Cl.
*F16F 15/08* (2006.01)
*F16F 1/44* (2006.01)
(Continued)

(52) U.S. Cl.
CPC .............. *F16F 15/08* (2013.01); *F16F 1/377* (2013.01); *F16F 1/3835* (2013.01); *F16F 1/3863* (2013.01); *F16F 1/44* (2013.01); *F16F 1/52* (2013.01); *F16F 2224/025* (2013.01); *F16F 2236/06* (2013.01); *F16F 2236/103* (2013.01); *F16F 2236/12* (2013.01)

(58) Field of Classification Search
CPC .......... F16F 15/08; F16F 1/377; F16F 1/3863; F16F 1/52; F16F 2236/12; F16F 2224/025; F16F 2236/06; F16F 2236/103

USPC ....... 248/550, 562, 580, 615, 618, 633, 634, 248/635; 384/536, 582
See application file for complete search history.

(56) References Cited

U.S. PATENT DOCUMENTS 3,244,386 A * 4/1966 Bourgeois ............... F16F 1/387
267/141.3
4,834,351 A * 5/1989 Freudenberg ....... F16F 13/1463
267/140.12
(Continued)

FOREIGN PATENT DOCUMENTS

CN 2814000 Y 9/2006
CN 102966691 A 3/2013
(Continued)

*Primary Examiner* — Muhammad Ijaz
(74) *Attorney, Agent, or Firm* — Richard M. Goldberg

(57) ABSTRACT

A bearing element (1) for mounting a component, especially a cooling module, with an elastomeric element (12), the elastomeric element (12) having an inner connection (6) for connecting to a bearing pin (7) of the component to be mounted, an outer connection (8) for connecting to a bearing frame (10), and at least one support arm (14), which extends between the inner connection (6) and outer connection (8) and elastically connects these together, with a force transfer surface (16) of the outer connection (8) to the bearing frame (10) formed by an outer end face of the support arm (10), and the bearing element (1) formed such that, in the event of an elastic displacement of the inner connection (6) relative to the outer connection (8) in a predetermined, radial displacement direction relative to the bearing element (1) the support arm (14) is stressed predominantly by thrust.

12 Claims, 7 Drawing Sheets

(51) Int. Cl.
*F16F 1/38* (2006.01)
*F16F 1/377* (2006.01)
*F16F 1/52* (2006.01)

(56) References Cited

U.S. PATENT DOCUMENTS

| | | | | |
|---|---|---|---|---|
| 5,118,068 | A * | 6/1992 | Noguchi | F16F 13/14 |
| | | | | 248/562 |
| 6,585,222 | B2 * | 7/2003 | Ihara | F16F 1/3873 |
| | | | | 248/308 |
| 8,167,286 | B2 * | 5/2012 | Hirano | F16F 7/108 |
| | | | | 188/379 |
| 10,215,249 | B2 * | 2/2019 | Kaneko | F16F 1/38 |
| 2012/0319337 | A1 * | 12/2012 | Kato | F16F 1/3863 |
| | | | | 267/141 |
| 2015/0152953 | A1 * | 6/2015 | Sykes | F16F 1/3849 |
| | | | | 180/312 |
| 2016/0053848 | A1 * | 2/2016 | Nakamura | F16F 1/3842 |
| | | | | 248/634 |
| 2016/0193907 | A1 * | 7/2016 | Satou | F16F 1/3849 |
| 2017/0167559 | A1 * | 6/2017 | Kim | B60K 17/00 |

FOREIGN PATENT DOCUMENTS

| | | |
|---|---|---|
| DE | 2633612 A1 | 3/1977 |
| DE | 3137343 A1 | 4/1983 |
| DE | 3445491 C1 | 4/1986 |
| DE | 3818224 A1 | 12/1989 |
| DE | 19741462 C1 | 5/1999 |
| DE | 19831114 A1 | 1/2000 |
| FR | 1362638 | 4/1964 |

\* cited by examiner

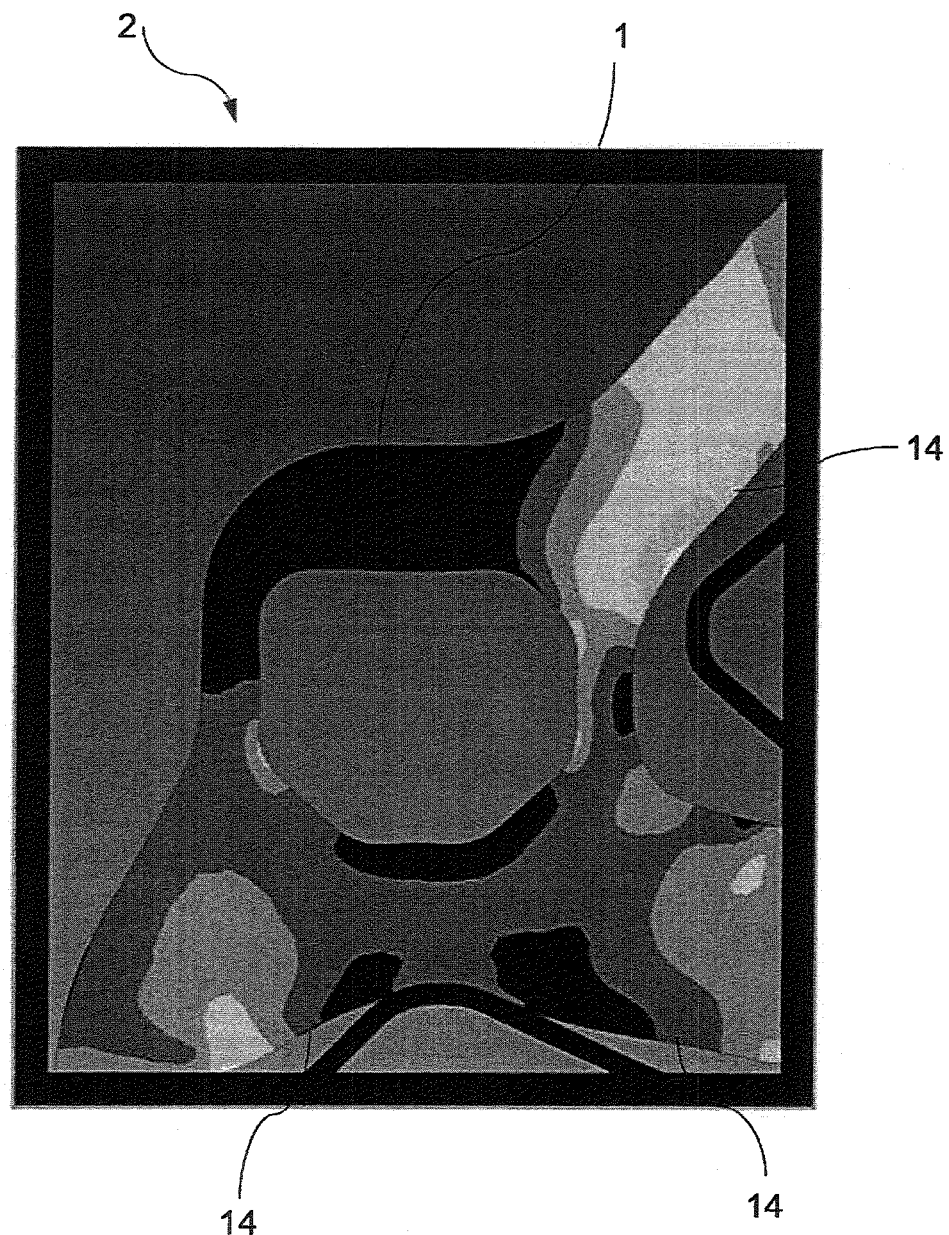
Fig. 5
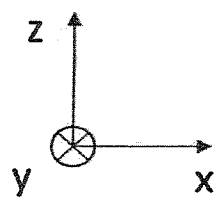

BEARING ELEMENT AND BEARING

BACKGROUND OF THE INVENTION

The invention relates to a bearing element for the substantially vibration-decoupling mounting of a component, in particular a cooling module, for example for a motor vehicle.

For such bearing elements, the technical challenge consists, on the one hand, of decoupling a component, which is to be mounted therewith, essentially from vibrations, which develop, for example, during the operation of a vehicle and, on the other, to provide a bearing, which is stable enough to take up partly high forces, which act on the bearing or transfer them to a different component, without themselves suffering damage.

Especially in the case of a bearing element for cooling modules of motor vehicles, high forces can occur at the bearing element, for example, in the case of an intermediate cooler, which is integrated in a cooling module, or an intercooler for a turbocharger. For example, at a charging pressure of about 3.5 bar, a force of about 800-850 N can act upon the cooling module, especially in the driving direction of the motor vehicle. This force has to be absorbed by the bearing element. The bearing element may be deformed so strongly by these forces, that the bearing element strikes against a bearing or vehicle frame, so that a proper decoupling of cooling module and vehicle frame no longer is ensured. Because of contact between the bearing element and the bearing or vehicle frame, there may be unpleasant vibrations and noises. Because of the large deformation, an elastomeric element of the bearing element may be damaged. In the case of known bearing elements and at such large displacements or forces, high extensions, especially extension peaks, which may lead to the failure of the elastomeric elements, usually occur in the elastomeric elements.

SUMMARY OF THE INVENTION

It is an object of the present invention to provide an improved bearing element with a longer service life, as well as a corresponding bearing.

One aspect relates to a bearing element, especially for an essentially vibration-decoupling mounting of a component, particularly a cooling module. The bearing element has an elastomeric element, which has an internal connection for connection to a bearing pin of the component, which is to be mounted. Furthermore, the elastomeric element has an outer connection for connection to a bearing frame. The elastomeric element has at least one support arm, which extends between the internal connection and the outer connection and connects these elastically with one another, wherein a force transfer surface of the outer connection to the bearing frame is formed by means of an outer end face of the support arm. The bearing element is designed so that, in the case of an elastic displacement of the inner connection in a predetermined radial displacement relative to the bearing element, the support arm is subjected to a load predominantly by thrust.

It is an advantage of the present invention that, due to the construction of the bearing element, the load on the elastomeric element, which is provided to transfer forces, is reduced and, with that, the service life of the bearing element is increased. Especially due to the fact that the support arm of the elastomeric element is put under load primarily by thrust, fewer local extension peaks occur and the force is distributed more uniformly over the support arm, which has a positive effect on the load-carrying capacity and the service life of the bearing element.

The component, in particular the component to be mounted, may be a force-loaded component, wherein the forces on the component can be absorbed by the bearing and/or can be transferred to another element for absorption and can be decoupled substantially by means of the mounting from vibrations, which may occur at an installation location of the bearing. For example, the component may be a cooling module for a motor vehicle, which is to be connected over the bearing element with a vehicle frame.

The elastomeric element may be an elastic body, which is capable, on the one hand, of decoupling the component from vibrations of a different part connected with the component over the elastomeric element and, on the other, is capable of taking up a force from the component and/or transferring it to a further part. For example, the elastomeric element may contain natural or synthetic rubber.

By means of the inner connection, the component may be connected directly or indirectly with the elastomeric element. The inner connection may be disposed within the elastomeric element, preferably in about the middle of the elastomeric element. The inner connection may extend essentially in the axial direction through the elastomeric element at least partially over the axial extent of the elastomeric element.

The inner connection may be constructed as a sleeve for accommodating a bearing pin of the component. However, it is also conceivable that the inner connection is formed by an axial recess in the elastomeric element, in which the bearing pin may be inserted or accommodated. The sleeve may be embedded in the elastomeric element. In other words, the elastomeric element may be cast or sprayed onto the sleeve. The sleeve may be made of metal or plastic.

The support pin may be essentially a rigid connecting device for connecting to the bearing element, especially with inner connection of the elastomeric body. For example, the support pin may be constructed essentially as a cylindrical pin, protruding from the component. The component may have one or several bearing pins, which may each be connected with an inner connection of a corresponding bearing element.

The outer connection may extend radially outward at the elastomeric element in the circumferential direction. In other words, the outer connection may be formed by the radially outer surface of the elastomeric element. The outer connection may be formed circumferentially at the elastomeric element or may be formed essentially by the outer front side of the support arm or the outer front sides of a plurality of support arms, wherein elastomeric material may not be present between the outer end faces of the support arms. In a substantially axial direction of the elastomeric element, the outer connection may extend at least partially over the axial extent of the elastomer element.

The outer connection may be formed, for example, by casting the elastomeric element to the bearing frame. For example, the elastomeric element may be molded or molded to the inner sleeve and the outer bearing frame may be cast or sprayed to the outer bearing frame in one step. The inner connection, the elastomeric element and the outer connection may be aligned concentrically with each other and may have substantially the same axial extent or width. The bearing frame may also be aligned concentrically with the inner connection, the elastomeric element and the outer connection and may also have substantially the same axial extent or width.

Between the inner connection and the outer connection and between the supporting element or supporting elements, the elastomeric element has at least one gap, so as to make room for the displacement of the inner connection relative to the outer connection.

The bearing frame may, in particular, be a rigid frame, surrounding the outer connection in the circumferential direction. The bearing frame may also be referred as a bearing housing. The bearing frame and the outer connection may have the same extent in essentially the axial direction. The bearing frame may be configured in such a manner, that it may be connected firmly to a vehicle frame, for example, by means of a fastening screw. The sleeve may be made of metal or plastic.

The at least one support arm may be formed at the circumference of the inner connection and extend from the inner connection in a substantially a radial direction to the outer connection or to the bearing frame. The bearing element may have one, two, three, four or more support arms in order to achieve desired bearing properties in the anticipated displacement directions of the bearing element. In this case, various types of support arms, particularly inventive and conventional support arms, may be combined with one another. All the support arms of the bearing elements may also be configured inventively.

The outer end face of the support arm may be disposed at a radial end section of the support arm and extend in a substantially axial direction at least partially over the axial extent of the support arm. The outer end face of the support arm may also be referred to as the outer front surface of the support arm. In the circumferential direction, the outer end face may extend at least partially over the extension of the support arm in the circumferential direction. The outer end face of the support arm may have an expansion in comparison to an intermediate section of the support arm between the inner connection and the outer connection.

The force transfer surface may be referred to as the outer surface of the outer connection, over which substantially all of the force is transferred from the support arm to the bearing frame, particularly when the inner connection is displaced relative to the outer connection in the predetermined radial displacement direction. In particular, the force transfer surface may be a contact area of the outer end face of the support arm with the bearing frame. The force transfer surface may be oriented substantially perpendicularly to the predetermined radial displacement direction. Preferably, the force transfer surface is a flat surface.

The force transfer surface may coincide with the outer end face of the support arm or at least contain it. Additionally, an area of the outer connection, adjoining the upper end face, may be part of the force transfer surface, provided that forces are transferred over these areas.

For the purposes of the present invention, thrust can be a shear stress, which acts tangentially to a surface, that is, which represents a shear stress. The predominant thrust load in the sense of the present invention is an at least sectional thrust load in relation to the load with other types of stresses, such as tension and/or pressure, in an order of magnitude of more than about 50%, advantageously more than about 60% or more than about 70%.

The normal to the force transfer surface in the centroid of the force transfer surface may, in particular, be in the case of a non-planar force transfer surface, a surface normal averaged over the force transfer surface. Irregularities and/or elevations and depressions of the force transfer surface can thus be compensated for the consideration of the surface normal.

Particularly in the case of a plane force transfer surface, the centroid of the force transfer surface may lie in a radial cross section of the bearing element through the force transfer approximately in the middle between opposite boundary points of the force transfer surface.

In an x-y-z coordinate system used below, an x-direction is defined as a traveling direction of a motor vehicle equipped with the inventive bearing element. A y-direction is oriented transversely to the x-direction and is perpendicular to it. The y-direction may represent the width direction of the vehicle. A z-direction is oriented counter to the direction of gravity and is perpendicular to the other two directions. The positive directions result from the use of a right-handed coordinate system and the application of the right-hand rule. The x and z directions may represent radial directions with respect to the bearing element, whereas the y-direction may represent the axial direction of the bearing element.

For the purposes of the present invention, the terms "oben" (above) or "oberhalb" (above) and the like, used below, mean a direction in the direction counter to that of gravity, that is in the positive z– direction. For the purposes of the present invention, the terms "unten" (below) or "unterhalb" (underneath) and the like, used below, mean a direction in the direction counter to that of gravity, that is in the negative z– direction.

For the purposes of the present invention, the terms "außen" (outer) or "innen" (inner) and the like, used below, mean that a center, in particular an idealized or imaginary center, is an innermost point. An outer area in relation thereto is a point or region, particularly an idealized or imaginary, circumferential area, which is described as lying further outside than a different point or region, that is, starting out in the radial direction from the center, further removed in the direction of the circumferential region than the other point or region.

The predetermined displacement direction, which is aligned radially relative to the bearing element, may be the direction of travel of a motor vehicle, which is equipped with the inventive bearing element, that is to say, the positive x direction in the above-mentioned coordinate system. The y direction or the z direction may also be the predetermined displacement direction.

Preferably, a normal to the force transfer surface in the centroid of the force transfer surface does not intersect the inner connection.

The normal in the sense of the present invention may be a direction, which is perpendicular to a surface.

The normal may be one, which is averaged over the force transfer surface and is applied in the centroid of the force transfer surface.

In the sense of the present invention, the centroid may be a geometric center of gravity of a surface.

Thus, the force transfer surface is spaced at a distance from the inner connection, so that the support arm in a force transfer from the inner connection to the bearing frame experiences a load more by thrust than by another type of stress such as strain or pressure. For example, when the inner connection is displaced elastically relatively to the outer connection, the force transfer surface may be formed spaced apart in the x direction in such a way in the positive z direction, that the supporting arm is loaded predominantly by thrust.

Preferably, a normal at a circumference of the force transmission surface does not intersect the inner connection.

This contributes further to the fact that the force transfer surface is spaced away from the inner connection formed so that the support arm, during a force transfer from the inner connection to the bearing frame experiences a thrust load rather than another type of stress such as by tension or pressure. Preferably, a normal at a circumference of the force transfer surface does not intersect the inner connection. That is, even at a point of the circumference of the force transfer surface, which is closest to the inner connection in the radial direction, the, in particular averaged, normal of the force transfer surface does not intersect the inner connection.

This contributes further to the fact that the force transfer surface is spaced away from the inner connection formed in such a way that the support arm, during a force transfer from the inner connection to the bearing frame, experiences a thrust load rather than another type of stress such as by tension or pressure.

Preferably, in particular in the case of a plane force transfer surface, a normal of the force transfer surface in the centroid of the force transfer surface lies in a radial cross section of the bearing element approximately in the middle between opposite boundary points of the force transfer surface. The orientation or direction of extension of the support arm may be a line connecting a center point of the bearing element or of the inner connection with the centroid of the transfer surface.

The orientation of a respective support arm may enclose an angle of about 30° to about 50° with the normal of the force transfer surface of the respective support arm. Preferably, the angle is between about 35° and about 45°.

Preferably, the force transfer surface extends in a single plane.

Thus, the force transfer surface has no projections or setbacks, and/or does not extend around a corner and/or does not extend over several levels, which can result in a distribution of the force to be transmitted in components that a different type of stress than a thrust stress can bring about. This contributes further to the fact that the support arm, in the case of a force transfer from the inner connection to the bearing frame, experiences a load by thrust rather than by another type of stress such as by tension or pressure.

Preferably, the elastomeric element at a transition from the inner connection to the support arm has a thickened region.

The thickened region may be an area on the elastomeric element, which has a larger radial extent than other areas of the elastomeric element. In the radial cross-section, the thickened region may have a radial thickness of, for example, about 30% to about 100% and preferably of about 50% to about 80%, with respect to the thickness of the support arm transversely to the extension direction of the support arm. The thickened region preferably is formed so that, when the inner connection is displaced in the predetermined radial displacement direction, such as, for example, the x direction or the z direction, a force from the inner connection can be introduced over the thickened region into the support arm.

An improved force flow from the inner connection to the support arm for an effective force transfer from the inner connection over the elastomeric element and to the support arm to the bearing frame is thus favored.

Preferably, a ratio of a first distance from an inner edge of the inner connection to an outer edge of the elastomeric element to a second distance from the outer edge of the elastomeric element to an outer edge of the force transfer surface of the support arm is between about 50% and about 200%, preferably between about 75% and about 175% and more preferably between about 100% and about 150%.

The distance of the edges may be determined along a radial line, which contains the center of the inner connection and extends transversely to the predetermined radial displacement direction. This means that, if the support arm is designed for a radial displacement in the x-direction, the distance of the edges along the z-direction can be determined.

This contributes further to the fact that the force transfer surface is spaced away from the inner connection formed, so that the support arm in a force transfer from the inner connection to the bearing frame experiences a thrust load rather than another type of stress, such as by tension or pressure.

Preferably, the bearing element has two support arms, which are designed for a force transfer in a main displacement direction.

The main displacement direction can be a displacement direction with anticipated large displacements or displacement forces and consequently high loads for the bearing element. In particular, the main direction of displacement may be the predetermined direction of displacement, that is, for example, the x-direction, which may correspond to the direction of travel of a motor vehicle, which has been disengaged from the bearing element. The bearing element may, however, be configured so that, in the event of a displacement of the inner connection relative to the outer connection in the x direction, both support arms are subjected predominantly to a thrust load. The bearing element may, however, also be configured so that, in the event of a displacement of the inner connection in the x direction as well as in the z direction, both support arms are subjected predominantly to a thrust load. The bearing element may have a total of two support arms.

Particularly preferably, the bearing element has a total of three support arms, which are all equipped with the above-described inventive features. In this case, for example, the bearing element may be configured so that two support arms are predominantly subjected to thrust upon displacement of the inner connection in the x-direction, and the third support arm is loaded predominantly by thrust upon a displacement of the inner connection in the z-direction. The bearing element may, however, also be configured so that, all three support arms are subjected predominantly to a thrust load in the event of a displacement of the inner connection in the x direction as well as in the z direction.

In a preferred embodiment, a first of the three support arms may extend obliquely forward and upward, that is, in a positive x and z direction, and have a force transfer surface, which extends substantially in the z-y plane. A second of the three support arms may extend obliquely forward and downward, that is, in a positive x direction and a negative z direction, and have a force transfer surface, which extends substantially in the z-y plane. A third of the three support arms may extend obliquely backwards and downwards, that is, in the negative x direction and negative z direction, and have a force transfer surface, which extends substantially in the x-y plane. The elastomeric element may have a first thickened region at the top of the inner connection, that is, in the region of the transition from the inner connection to the first support arm, the elastomeric element may have a second thickened region at the bottom of the inner connection, that is, in the region of the transition from the inner connection to the second and the third support arm, in particular, between the second and the third support arm. In particular, the support arms may be disposed asymmetrically at the bearing element.

Preferably, a support arm is not provided in a cross section of the bearing element through the force transfer surface, in particular, not a cross section perpendicular to the axial propagation direction of the inner connection extending cross section, in an angular range of about 90° or about 120° or about 160° around the inner connection.

The angular range may be an area, extending substantially circumferentially around the inner connection, and sweeping the respective angle.

This means that, for example, a support arm for transferring forces, which is usually acted upon especially by a high tensile load and which is subjected correspondingly to a high elongation in the case of known bearing elements, may be omitted; the load on the inventive support arms nevertheless remains low, since the required bearing forces, as shear forces, can be absorbed by the support arm or arms. That is, the service life of the inventive bearing elements is increased in comparison to that of the known bearing elements.

Another aspect relates to a bearing with a bearing element described above, wherein the bearing has a bearing frame for connecting to an outer connection of the bearing element. Furthermore, the bearing has a bearing element receptacle for receiving the bearing element, wherein the bearing element is accommodated in the bearing element receptacle and wherein the upper end face of the outer connection abuts the bearing frame.

The advantages and implementations previously described for the bearing element apply analogously to the bearing with the bearing element described above.

For example, the bearing element, in particular the elastomeric element thereof, may be cast or sprayed onto the bearing frame. The outer end face of the outer connection refers, in particular, to the radial outer surface of the bearing element, which may enclose the outer end face(s) of the support arm or arms.

The bearing may have at least one fastening device for fastening to a component, in particular, to a motor vehicle frame. The fastening device may be formed at the bearing frame.

BRIEF DESCRIPTION OF THE DRAWINGS

An embodiment of the inventive feeding device is explained in more detail with reference to drawings. It is understood that the present invention is not limited to the embodiment described below and that individual features of the embodiment can be combined to form further embodiments.

FIG. 5 shows a front view of the bearing of FIG. 1 with visualized stresses or strains when displaced in the z-direction.

DETAILED DESCRIPTION

Figure 1:
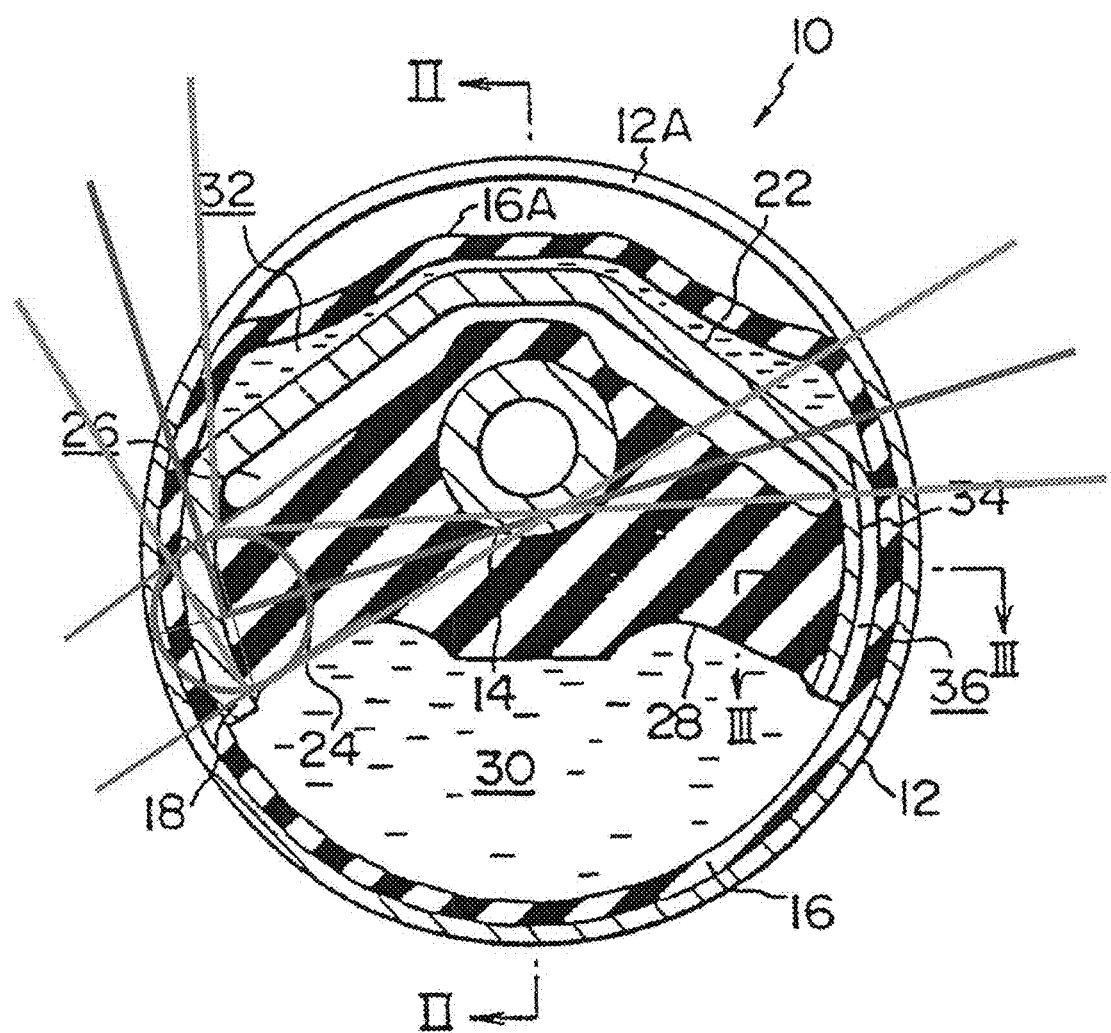
FIG. 1 shows a spatial view of an inventive bearing with a bearing element of an example of the invention.
Figure 2:
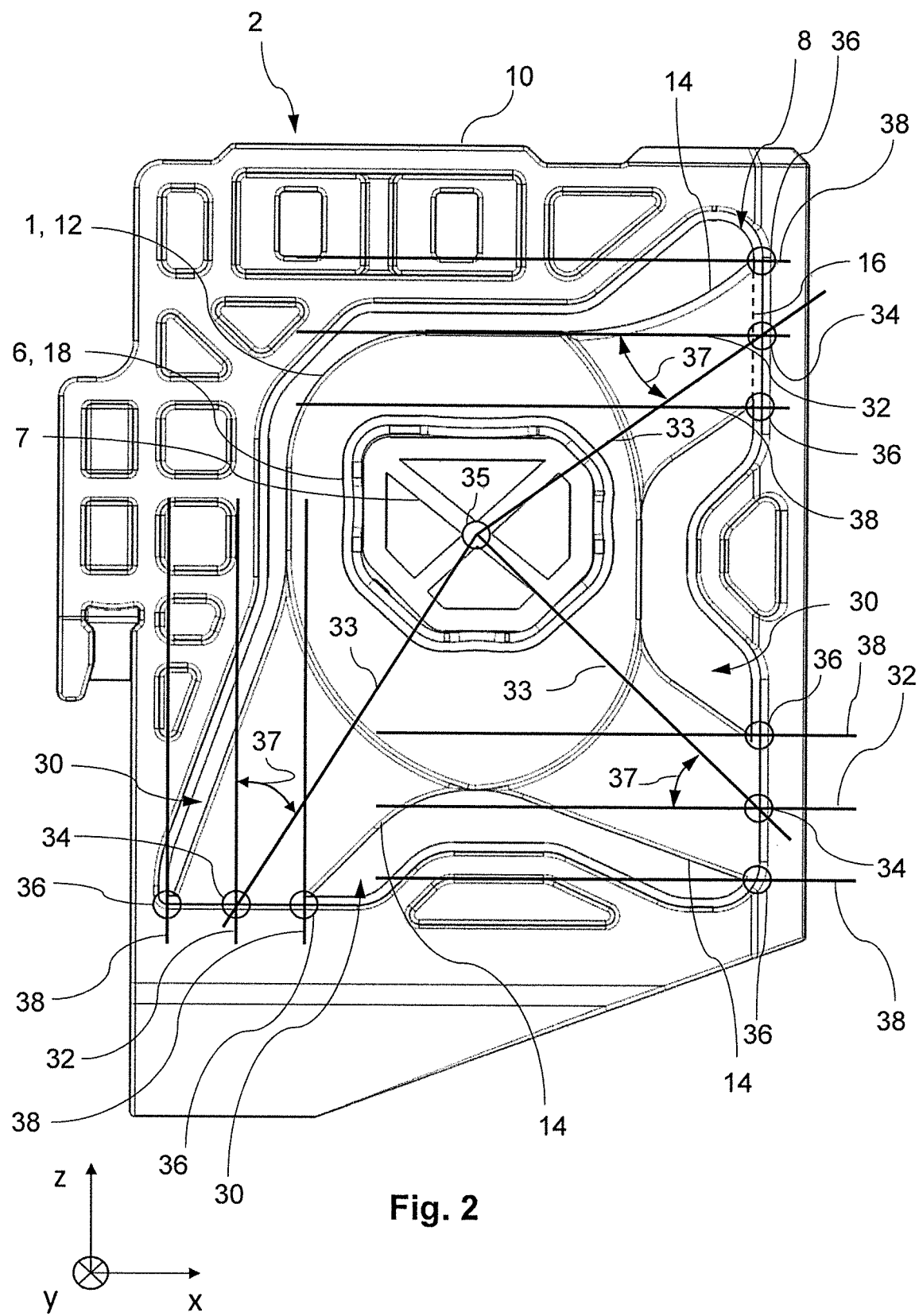
FIG. 2 shows a front view of the bearing of FIG. 1.
Figure 3:
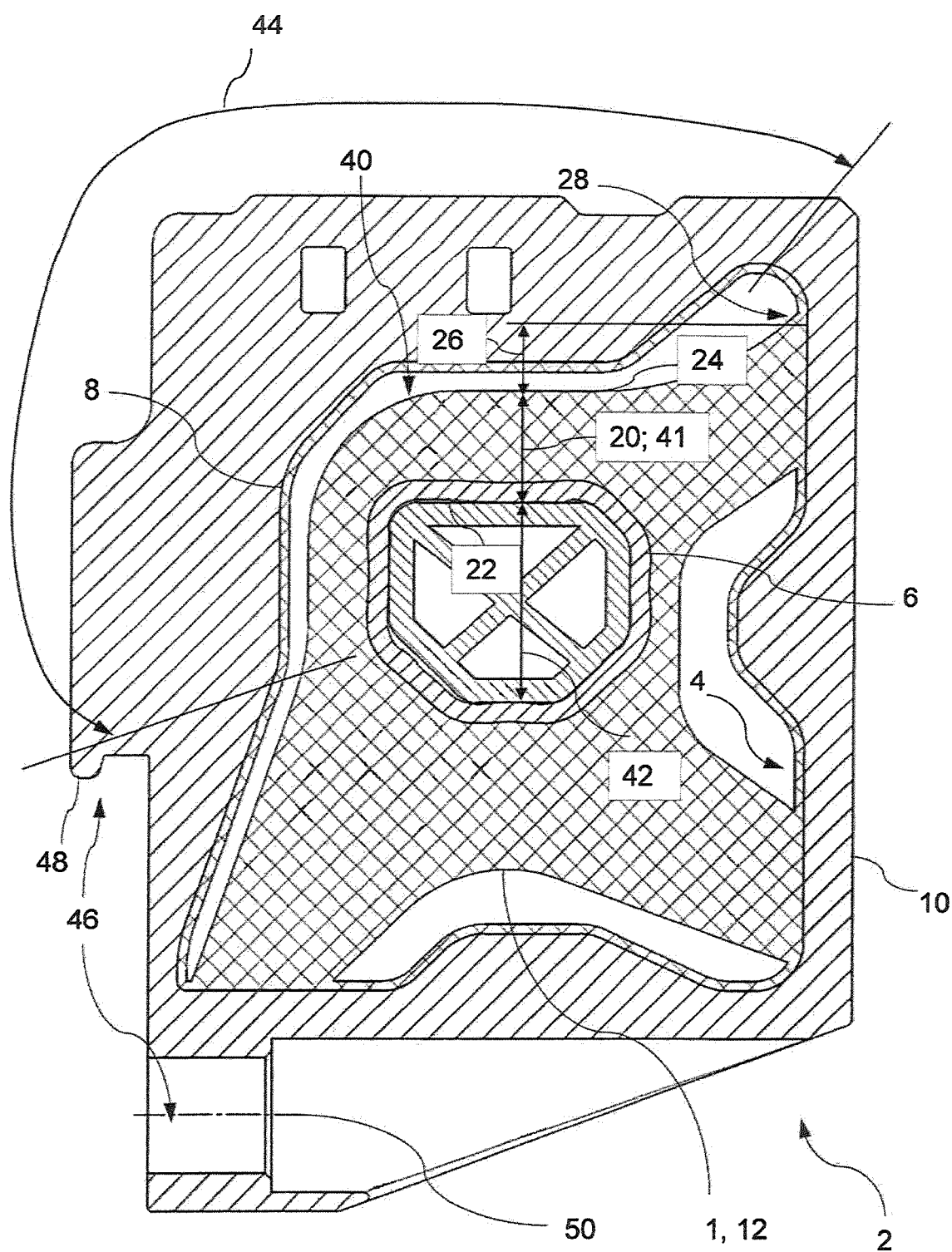
FIG. 3 shows a cross section of the bearing of FIG. 1.

With reference to FIGS. 1 to 3, an embodiment of an inventive bearing element 1 in a bearing 2 of the present invention is described below, wherein the embodiment shows a bearing 2 for a cooling module of a motor vehicle. In relation to the direction of gravity, the bearing 2 is shown in the installed position. The coordinate system shown in the Figures corresponds to the previously described x-y-z coordinate system.

In the view shown in FIG. 1, a bearing element 1 of an embodiment is taken up in an inventive bearing 2, especially in a bearing receptacle 4 of the bearing 2.

The bearing element 1 has an inner connection 6, by means of which a bearing pin 7 of the (not shown) cooling module can be connected. An outer connection 8, by means of which the bearing element 1 with a bearing frame 10 is connectable, can be connected to the inner connection 6. The bearing element 1 comprises an elastomeric element 12.

As shown here, the outer connection 8 may, for example, be cast or sprayed on the bearing frame 10, so as to connect the bearing element 1 with the bearing frame 10.

As shown, the elastomeric element 12 is formed with three support arms 14, each extending between the inner connection 6 and the outer connection 8 and connecting these elastically with one another. In each case, the outer end face of each support arm 14 form a force transfer surface 16 to the bearing frame 10.

The inner connection 6 may include a sleeve 18 for receiving the bearing pins 7 of the (not shown) cooling module or be designed as such. The outer connection 8 may include or be configured as the force transfer surface 16.

As shown particularly in FIG. 3, the outer connection 8 may, be designed so that it has an outward offset with respect to the inner part of the elastomeric element 12. Moreover, a ratio of a first distance 20 from an inner edge 22 of the inner connection 6 to an outer edge 24 of the elastomeric element 12 to a second distance 26 from the outer edge 24 of the elastomeric element 12 to an outer edge 28 of the force transfer surface 16 of the respective support arm 14 is between about 100% and about 150%.

The force transfer surface 16 may be an end face of the support arm 14 or a surface, by means of which substantially all of the force is transmitted from the support arm 14 to the bearing frame 10. A width dimension of the force transmitting surface 16 extends in the frontal view of the bearing in the plane of the drawing. The width of the force transfer surface 16 may correspond approximately to a width 17 of the bearing frame 10 shown in FIG. 1. In this embodiment, the force transfer surface 16 is a flat surface, which essentially corresponds to the end face of the respective support arm 14, with which substantially all the force can be transmitted from the support arm 14 to the bearing frame 10.

As shown in this embodiment, the force transfer surface 16 may extend on a single plane. That means that the force transfer surface 16, in this case, has no projections and/or setbacks and does not run around a corner.

The bearing element receptacle 4 may be formed so that, apart from the points at which the respective support arm 14 is connected to the bearing frame 10, a gap 30 is formed between the bearing element 1 and the bearing frame 10 or between an inner part of the elastomeric element 12 and the outer connection 8 of the elastomeric element 12. The gap 30 permits the inner connection 6 to be displaced relative to the outer connection 8, in particular, upon application of a force on the inner connection 6.

As shown in FIG. 2, a normal 32 to the force transfer surface 16 in the centroid 34 of the force transfer surface 16 may be approximately in the middle between boundary points 36 marked with circles, particularly in the case of a planar force transfer surface 16. The orientation or extension direction 33 of the respective support arm 14 can be formed as a connecting line of a center 35 of the bearing 2 or of the inner connection 6 and of the respective centroid 34, which is marked by a circle.

The orientation 33 of the respective support arm 14 may enclose an angle 37 of about 30° to about 50° and preferably about 35° to about 45° with the normal 32 of the force transfer surface 16 of the respective support arm 14.

The force transfer surface 16 advantageously may be arranged so that the normal 32 of the force transfer surface 16 in the centroid of an area 34 of the force transfer surface 16 does not intersect the inner connection 6.

As also shown, the force transfer surface 16 advantageously may be arranged so that no normal 38 on the circumference of the force-transfer surface 16 intersects with the inner connection 6.

The elastomeric element 12 has a thickened region 40 at a transition from the inner connection 6 to the respective bearing arm 14. As shown in the cross-section perpendicular to the axial propagation direction of the inner connection 6 in FIG. 3, a ratio particularly a radial, extension 41 of the thickening region 40 in the sectional plane to a particularly radial, extension 42 of the inner connection 6 in the sectional plane may amount to between about 40% and about 55%.

For the elastomeric element 12, no support arm 14 may be provided in an angular range 44 about the inner connection 6. In the present case, the angular range 44 may amount to about 160°, as shown here.

The bearing 2 may have at least one fastening device 46 for fastening to a component, in particular to a motor vehicle frame (not shown). Here, the fastening device 46 includes, for example, a detent 48 for engaging in a correspondingly formed (not shown) receptacle on the motor vehicle frame and a bore 50 for receiving a (not shown) screw for screwing into a corresponding thread on the motor vehicle frame.

Figure 4:
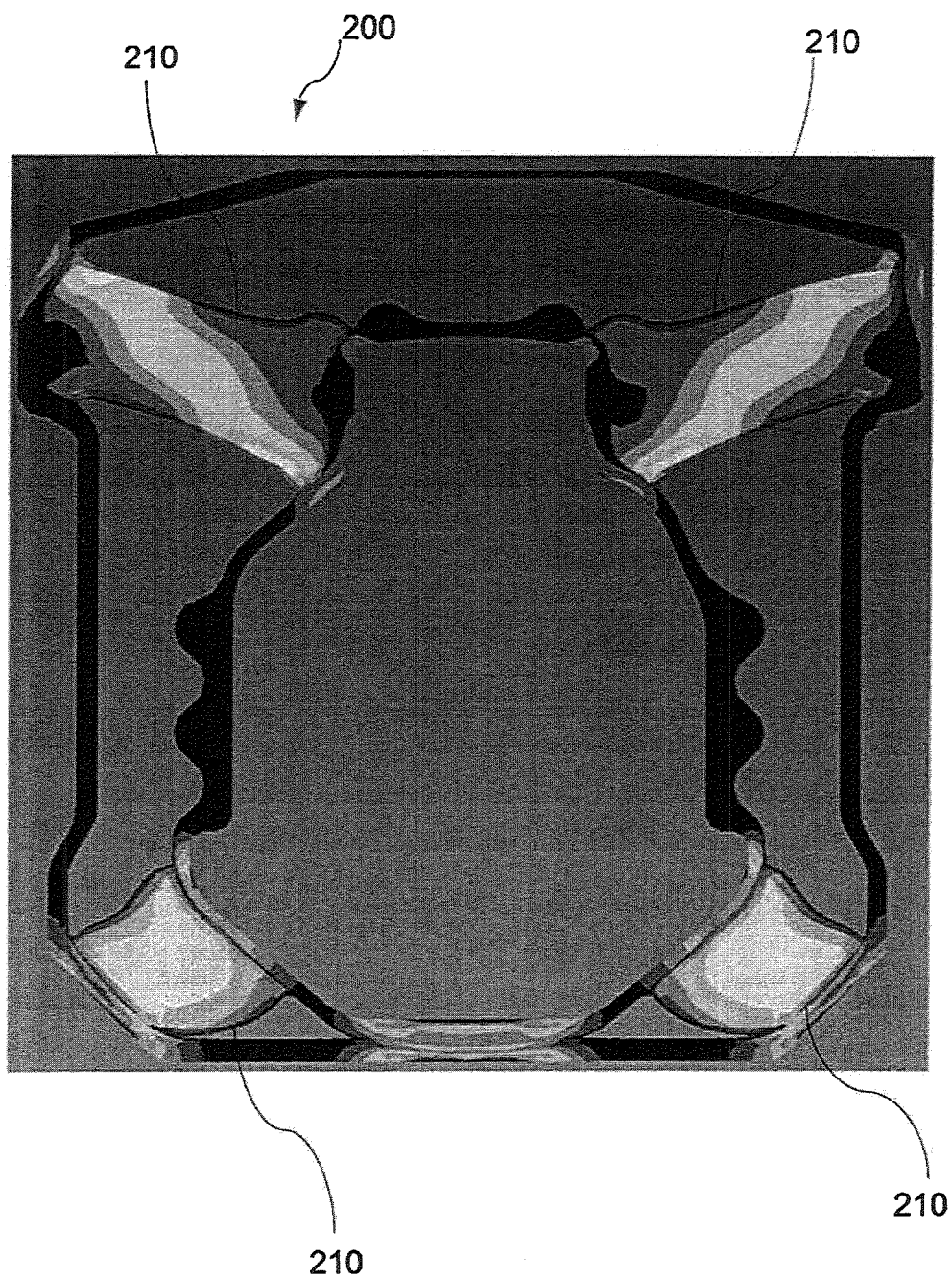
FIG. 4 shows a front view of a bearing, known from the prior art, with visualized stresses or strains in a displacement in the z-direction.
Figure 4:
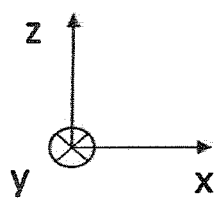

FIG. 4 shows a front view of a bearing 200, known from the prior art, with stresses or strains made visible, wherein it can be seen that high local stresses, in particular extension peaks, marked in the elements 210 by means of bright regions, arise during a displacement in the negative z-direction for force transmission.

In comparison, FIG. 5 shows a front view of the bearing 2 of FIG. 1 with stresses or strains made visible. It can be seen that the stresses or strains in the support arms 14 of the inventive bearing element 1 are distributed at approximately the same displacement force in the negative z-direction more evenly over the support arms and lesser local stress peaks, especially extension peaks, occur in the support arms than in the elements 210 for transmitting forces in the case of the bearings 200 known from the prior art.

Figure 6:
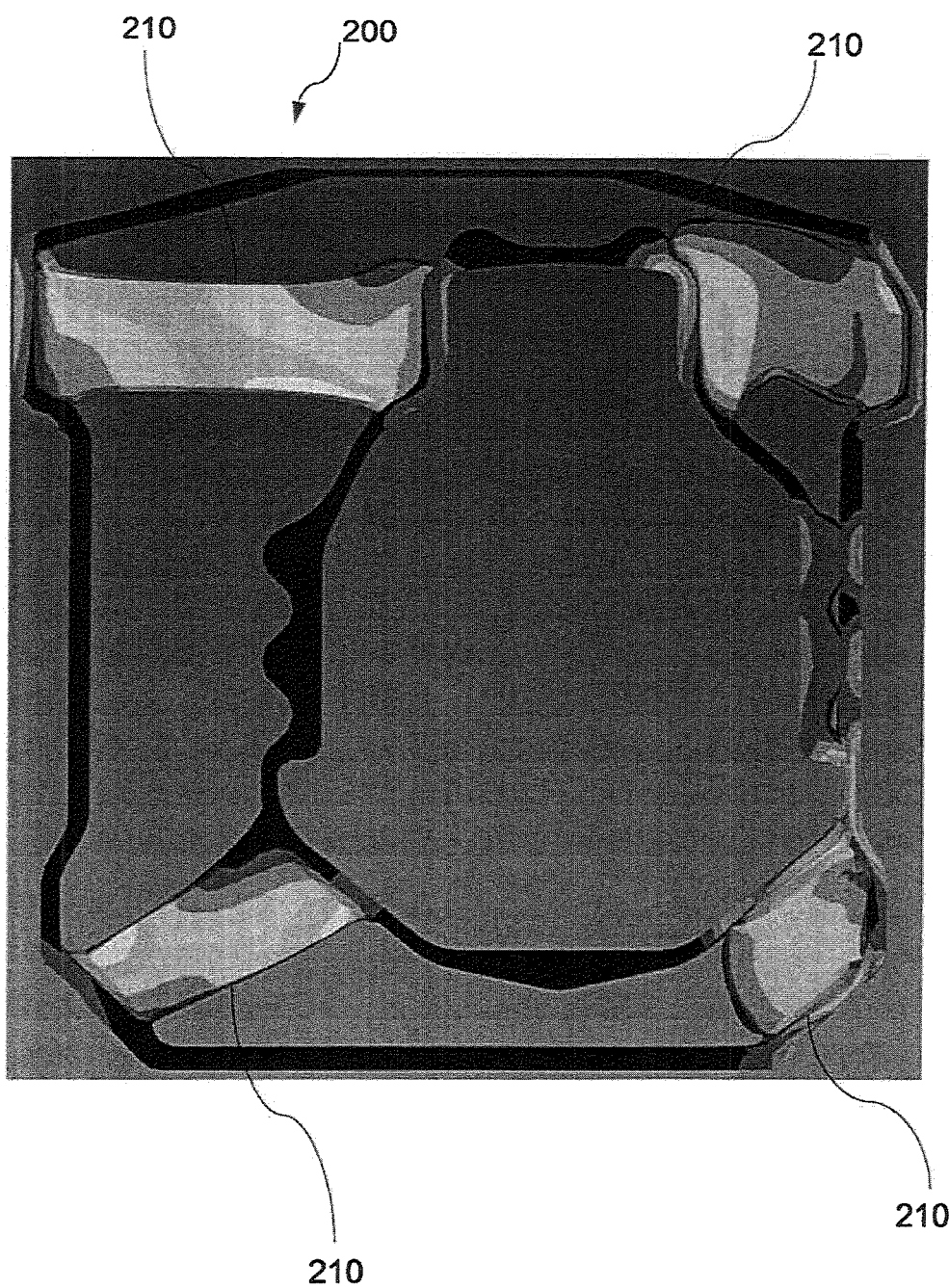
FIG. 6 shows a front view of a known from the prior art bearing with visualized stresses or strains when displaced in the x direction.

In the front view shown in FIG. 6 of the bearing 200, which is known from the prior art, with stresses or strains made visible, high local stresses, especially extension peaks, marked by means of bright regions, are recognizable in the elements 210 for transferring forces during a shift in the positive x direction.

Figure 7:
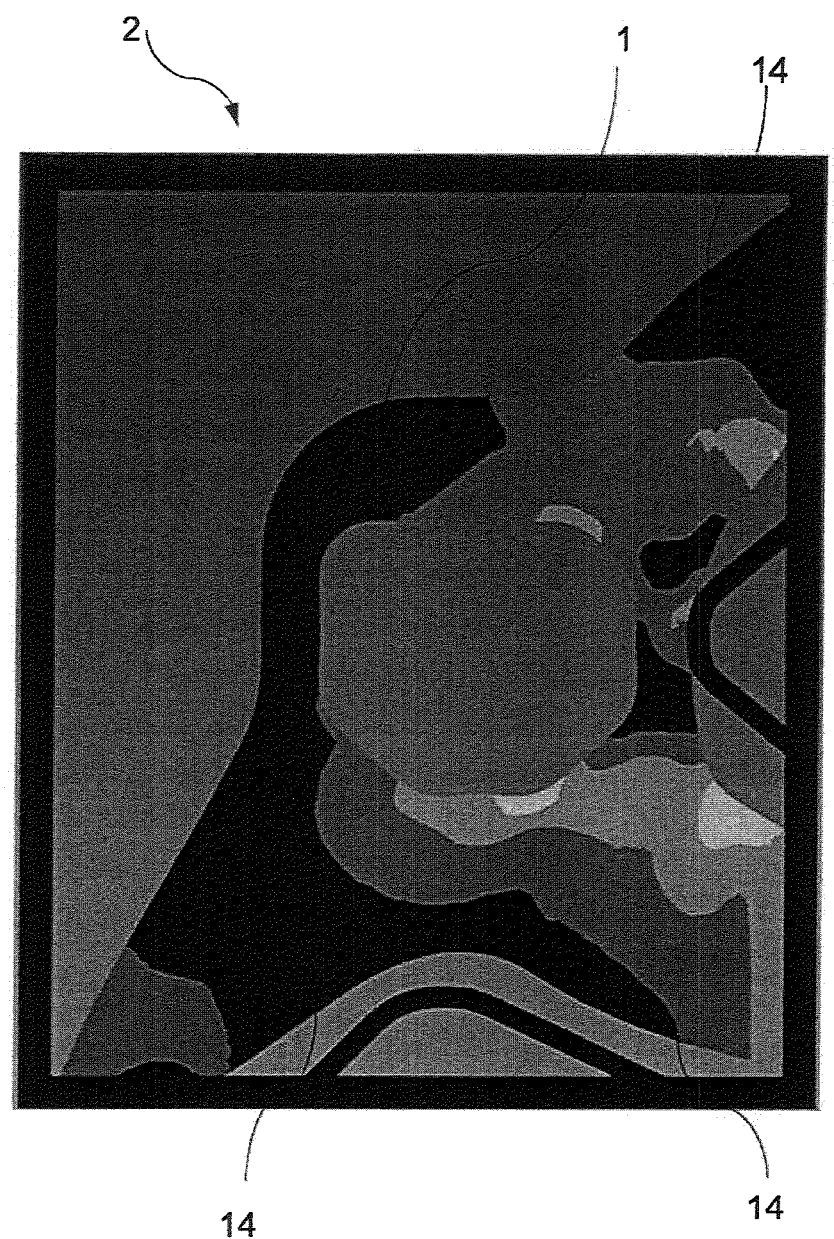
FIG. 7 shows a front view of the bearing of FIG. 1 with visualized stresses or strains when displaced in the x direction.
Figure 7:
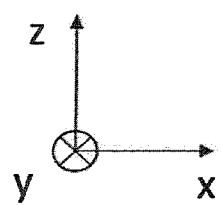

In comparison, FIG. 7 shows a front view of the bearing 2 of FIG. 1 with stresses or strains made visible, wherein it can be seen that the stresses or strains in the support arms 14 of the inventive bearing element 1, at about the same displacement force, are distributed more uniformly in the x direction and are lower than the stresses or strains in the elements 210 for transmitting forces for the bearing 200 known from the prior art. In this embodiment, since the displacement in the x direction corresponds to the displacement in the main displacement direction, this is of advantage for increasing the service life of the bearing body 1 and, with that, of the bearing 2.

LIST OF REFERENCE SYMBOLS 1 bearing element
2 bearing
4 bearing element receptacle
6 inner connection
7 bearing pin
8 outer connection
10 bearing frame
12 elastomeric element
14 support arm
16 force transfer surface
17 width
18 sleeve
20 first distance
22 inner edge of the inner connection
24 outer edge of the elastomeric element
26 second distance
28 outer edge of the force transfer surface
30 gap
32 normal in centroid of the force transfer surface
33 orientation of the support arm
34 centroid
35 center of the bearing
36 boundary point of the force transfer surface
37 angle between the orientation of the support arm and the normal
38 normal at the periphery of the force transfer surface
40 thickened region
41 extent of the thickened area
42 extent of the inner connection
44 angular rage
46 fastening device
48 latch
50 borehole
200 known bearing
210 elements for transferring forces

What is claimed is:

1. A bearing element for mounting a component with an elastomeric element,
    wherein the elastomeric element comprises:
    an inner connection for connecting to a bearing pin of the component to be mounted, an outer connection for connecting to a bearing frame, and
    at least one support arm extending between the inner connection and the outer connection and elastically connecting these together, wherein an outer end face of each support arm forms a force transfer surface of the outer connection to the bearing frame,
    wherein each force transfer surface includes a centroid, wherein the bearing element is constructed so that, in the event of an elastic shift of the inner connection relative to the outer connection in a predetermined displacement direction radially with respect to the bearing element, the support arm is placed predominantly under a thrust load, and
    wherein a line normal to the force transfer surface at the centroid of each force transfer surface does not intersect the inner connection;
    wherein the bearing element does not include any support arm having a line normal to the force transfer surface at the centroid of each force transfer surface that intersects the inner connection.

2. The bearing element of claim 1, wherein the normal does not intersect the inner connection at a periphery of the force transfer surface.

3. The bearing element of claim 1, wherein the force transfer surface extends in a single plane.

4. The bearing element of claim 1, wherein the elastomeric element has a thickened region at a transition from the inner connection to the at least one support arm.

5. The bearing element of claim 1, wherein a ratio of a first distance from an inner edge of the inner connection to an outer edge of the elastomeric element to a second distance of an outer edge of the elastomeric element up to an outer edge of the force transfer surface of the support arm is between about 50% and about 200%.

6. The bearing element of claim 1, wherein the at least one support arm includes two support arms, which are formed for a transfer of forces in a main displacement direction.

7. The bearing element of claim 1, wherein, in a cross section of the bearing element through the force transfer surface, no support arm is provided in an angular range of about 90° about the inner connection.

8. A bearing with the bearing element according to claim 1, wherein the bearing comprises:

a bearing frame for connecting with an outer connection of the bearing element, and a bearing element receptacle for receiving the bearing element, wherein the bearing element is accommodated in the bearing element receptacle and wherein the outer end face of the outer connection abuts the bearing frame.

9. The bearing element of claim 5, wherein the ratio is between about 75% and about 175%.

10. The bearing element of claim 5, wherein the ratio is between about 100% and about 150%.

11. The bearing element of claim 1, wherein, in a cross section of the bearing element through the force transfer surface, no support arm is provided in an angular range of about 120° about the inner connection.

12. The bearing element of claim 1, wherein, in a cross section of the bearing element through the force transfer surface, no support arm is provided in an angular range of about 160° about the inner connection.

* * * * *